United States Patent [19]

Etemadian

[11] Patent Number: 5,476,298
[45] Date of Patent: Dec. 19, 1995

[54] WEED PULLING DEVICE

[76] Inventor: Ali A. Etemadian, P.O. Box 8152, Laverne, Calif. 91750

[21] Appl. No.: 342,823

[22] Filed: Nov. 21, 1994

[51] Int. Cl.$^6$ .................................................. A01B 1/18
[52] U.S. Cl. .................................... 294/50.8; 294/115
[58] Field of Search ........................... 294/11, 19.1, 22, 294/50.5–50.9, 51, 115, 116, 118; 111/101, 106; 172/371, 372, 378, 380; 254/132

[56] References Cited

U.S. PATENT DOCUMENTS

| | | | |
|---|---|---|---|
| 87,844 | 3/1869 | Hale | 294/118 |
| 97,399 | 11/1869 | Holmes | 294/118 |
| 182,367 | 9/1876 | Jones | 294/50.8 X |
| 528,827 | 11/1894 | Thomas | 294/115 |
| 654,904 | 7/1900 | Marchant | 294/50.8 X |
| 1,025,360 | 5/1912 | Auter | 294/50.5 |
| 1,501,965 | 7/1924 | Moors | 294/50.5 |
| 1,514,863 | 11/1924 | Rytell | 294/50.8 X |
| 5,154,465 | 10/1992 | Pakosh | 294/50.8 |
| 5,234,241 | 8/1993 | Ikerd | 294/115 X |

FOREIGN PATENT DOCUMENTS 913961  3/1982  U.S.S.R. ............................ 294/50.8

*Primary Examiner*—Johnny D. Cherry

[57] ABSTRACT

A pulling device for removing weeds or other undesirable vegetation from a ground surface. The inventive device includes an engaging assembly having a pair of gripping feet which selectively engage the weed to be pulled. A handle assembly is mounted to the engaging assembly to facilitate manual manipulation and removal of the weed.

4 Claims, 5 Drawing Sheets

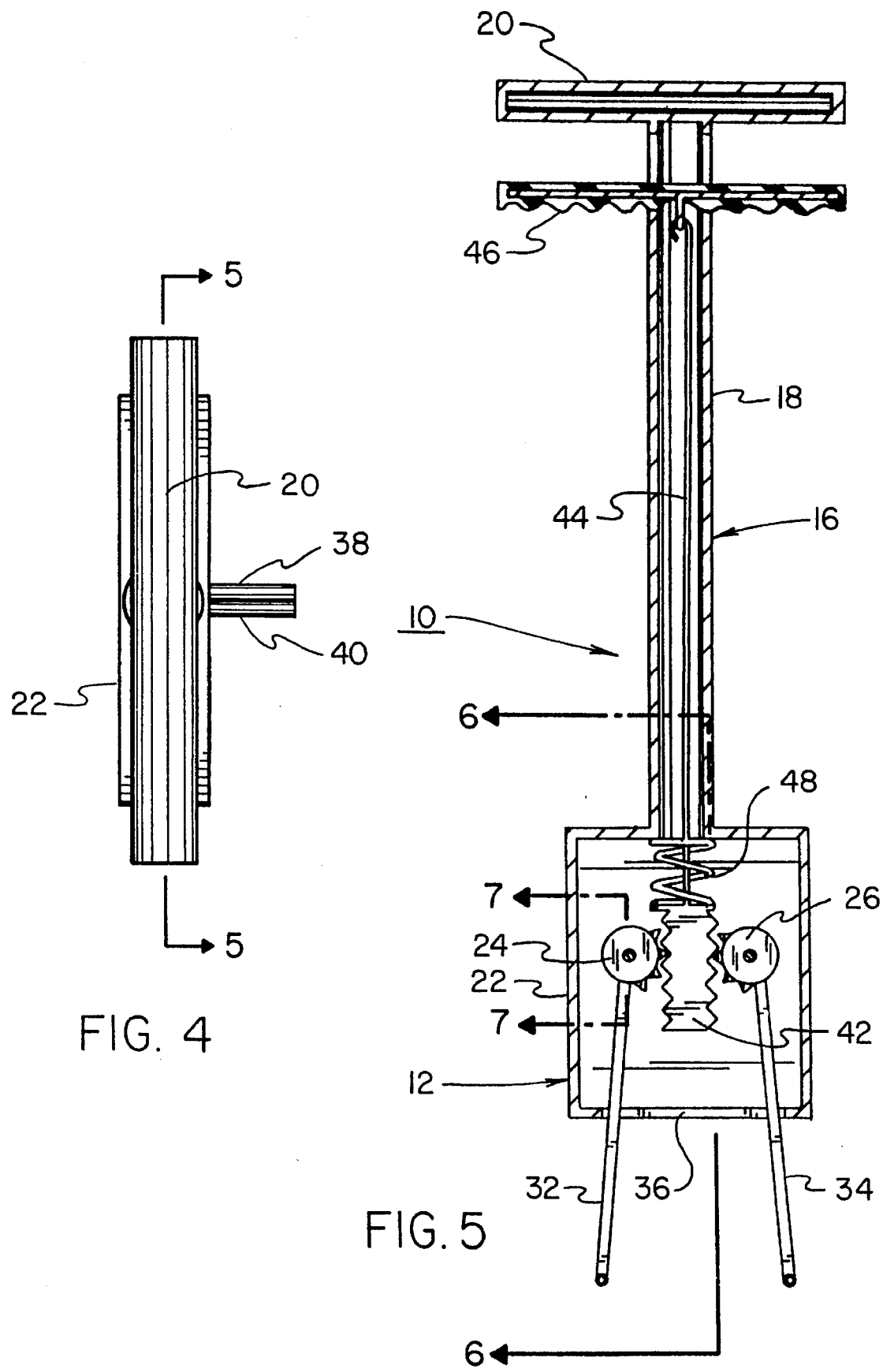

WEED PULLING DEVICE

BACKGROUND OF THE INVENTION

1. Field of the Invention

The present invention relates to weeding implements and more particularly pertains to a weed pulling device for removing weeds or other undesirable vegetation from a ground surface.

2. Description of the Prior Art

The use of weeding implements is known in the prior art. More specifically, weeding implements heretofore devised and utilized are known to consist basically of familiar, expected and obvious structural configurations, notwithstanding the myriad of designs encompassed by the crowded prior art which have been developed for the fulfillment of countless objectives and requirements.

Known prior art weeding implements include U.S. Pat. Nos. 5,257,666; 4,832,132; 4,736,928; 4,515,223; and 4,467,873.

While these devices fulfill their respective, particular objectives and requirements, the aforementioned patents do not disclose a weed pulling device for removing weeds from a ground surface which includes an engaging means having a pair gripping feet for selectively engaging the weed, and a handle means mounted to the engaging means to facilitate manual manipulation and removal of the associated weed.

In these respects, the weed pulling device according to the present invention substantially departs from the conventional concepts and designs of the prior art, and in so doing provides an apparatus primarily developed for the purpose of removing weeds or other undesirable vegetation from a ground surface.

SUMMARY OF THE INVENTION

In view of the foregoing disadvantages inherent in the known types of weeding implements now present in the prior art, the present invention provides a new weed pulling device construction wherein the same can be utilized for removing weeds from a ground surface. As such, the general purpose of the present invention, which will be described subsequently in greater detail, is to provide a new weed pulling device apparatus and method which has many of the advantages of the weeding implements mentioned heretofore and many novel features that result in a weed pulling device which is not anticipated, rendered obvious, suggested, or even implied by any of the prior art weeding implements, either alone or in any combination thereof.

To attain this, the present invention generally comprises a pulling device for removing weeds or other undesirable vegetation from a ground surface. The inventive device includes an engaging assembly having a pair of gripping feet which selectively engage the weed to be pulled. A handle assembly is mounted to the engaging assembly to facilitate manual manipulation and removal of the weed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new weed pulling device apparatus and method which has many of the advantages of the weeding implements mentioned heretofore and many novel features that result in a weed pulling device which is not anticipated, rendered obvious, suggested, or even implied by any of the prior art weeding implements, either alone or in any combination thereof.

It is another object of the present invention to provide a new weed pulling device which may be easily and efficiently manufactured and marketed.

It is a further object of the present invention to provide a new weed pulling device which is of a durable and reliable construction.

An even further object of the present invention is to provide a new weed pulling device which is susceptible of a low cost of manufacture with regard to both materials and labor, and which accordingly is then susceptible of low prices of sale to the consuming public, thereby making such weed pulling devices economically available to the buying public.

Still yet another object of the present invention is to provide a new weed pulling device which provides in the apparatuses and methods of the prior art some of the advantages thereof, while simultaneously overcoming some of the disadvantages normally associated therewith.

Still another object of the present invention is to provide a new weed pulling device for removing weeds or other undesirable vegetation from a ground surface.

Yet another object of the present invention is to provide a new weed pulling device which includes an engaging means having a pair gripping feet for selectively engaging the weed, and a handle means mounted to the engaging means to facilitate manual manipulation and removal of the associated weed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a top plan view thereof.

FIG. 5 is a cross sectional view taken along line 5—5 of FIG. 4.

DESCRIPTION OF THE PREFERRED EMBODIMENT

Figure 1:
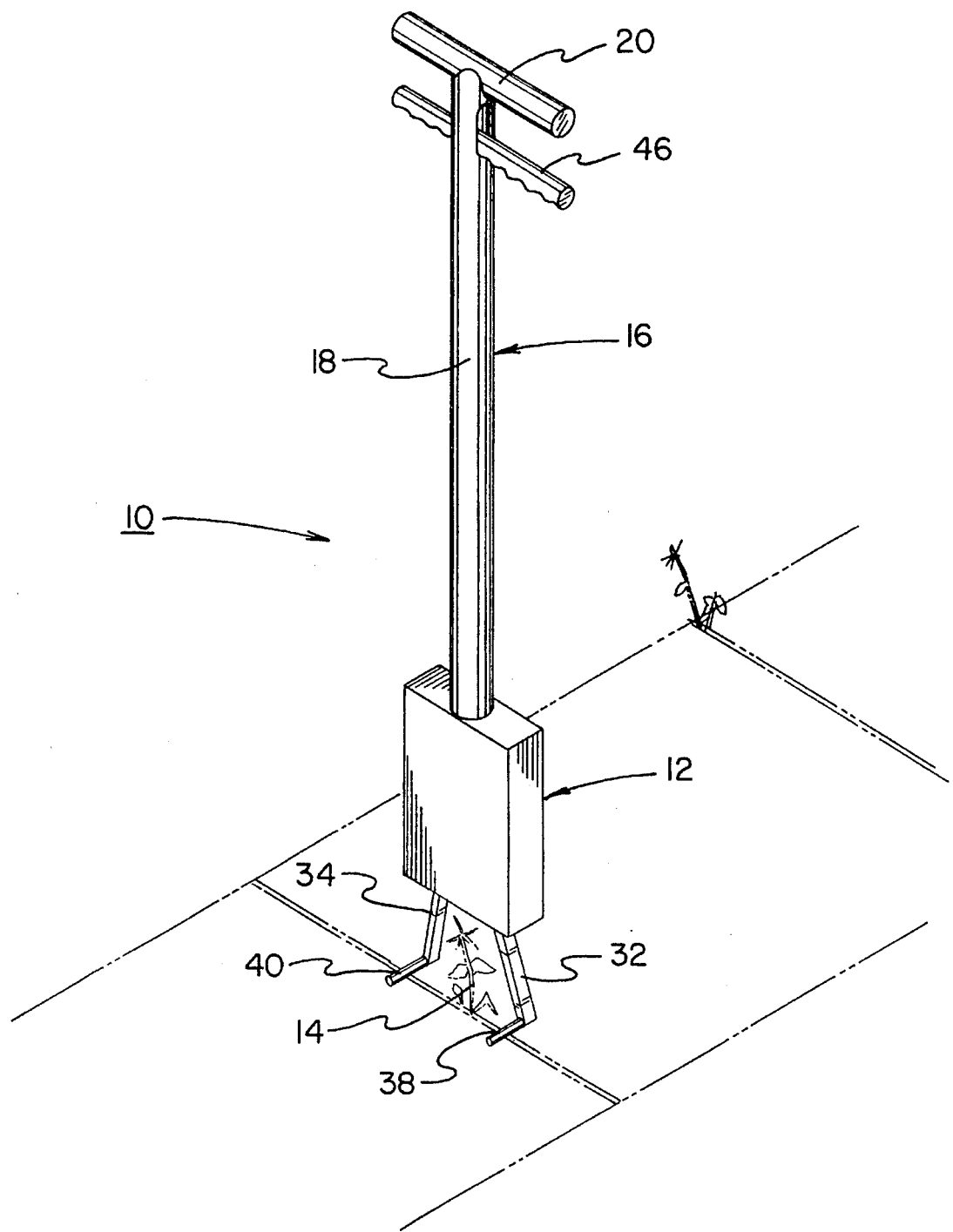
FIG. 1 is an isometric illustration of a weed pulling device according to the present invention in use.
Figure 2:
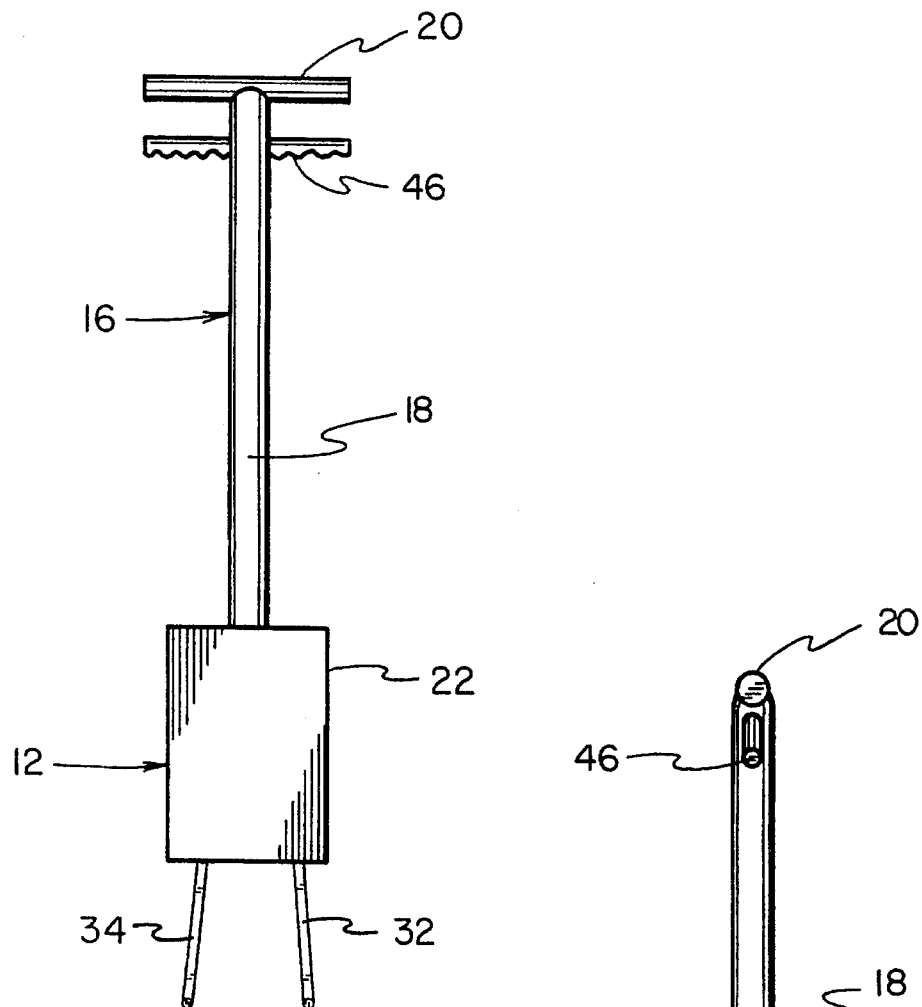
FIG. 2 is a front elevation view thereof.
Figure 3:
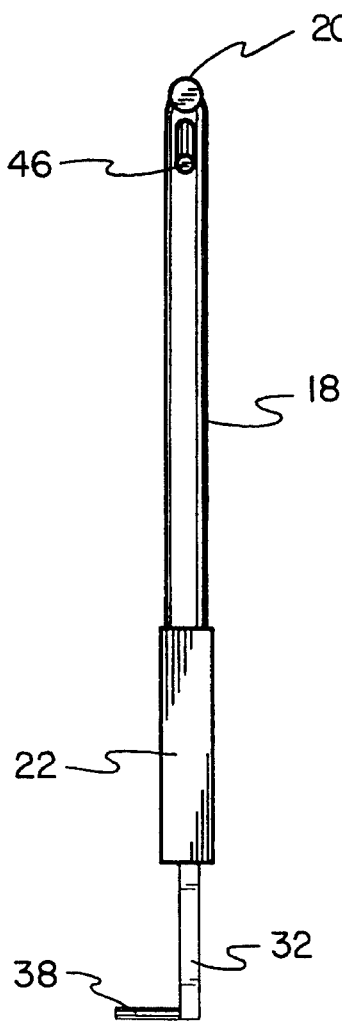
FIG. 3 is a side elevation view of the weed pulling device.

With reference now to the drawings, and in particular to FIGS. 1–9 thereof, a new weed pulling device embodying the principles and concepts of the present invention and generally designated by the reference numeral 10 will be described.

More specifically, it will be noted that the weed pulling device 10 comprises an engaging means 12 for engaging a weed 14 to be pulled from an unlabeled ground surface, and a handle means 16 coupled to the engaging means 12 for facilitating manual manipulation of the engaging means during removal of the weed from the ground surface.

As best illustrated in FIGS. 1 through 5, it can be shown that the handle means 16 according to the present invention 10 preferably comprises a substantially hollow handle tube 18 extending from the engaging means 12 and terminating in an orthogonally oriented T-handle 20. By this structure, an individual can utilize both hands to grasp the T-handle 20 on opposed sides of the handle tube 18 during manipulation of the device 10.

Figure 6:
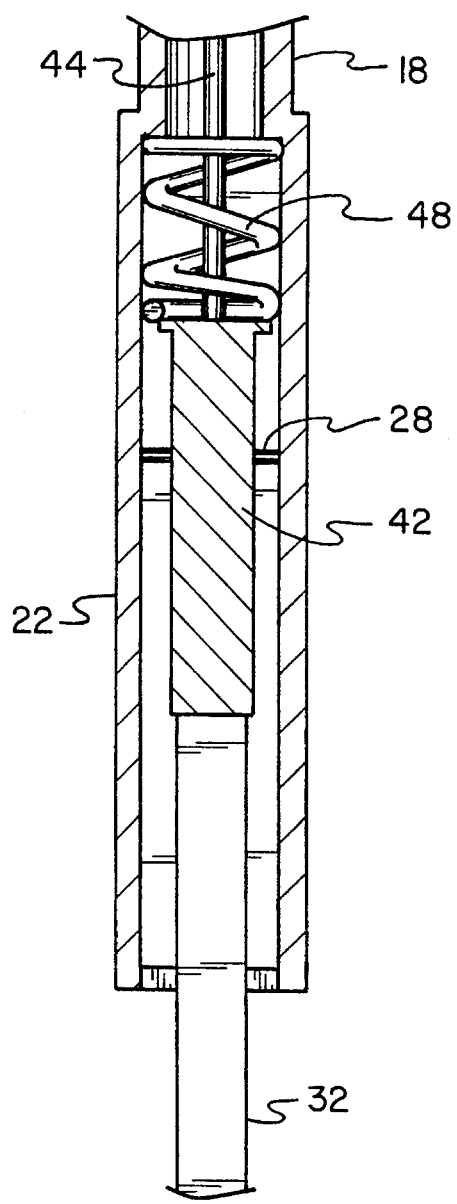
FIG. 6 is a cross sectional view taken along line 6—6 of FIG. 5.
Figure 7:
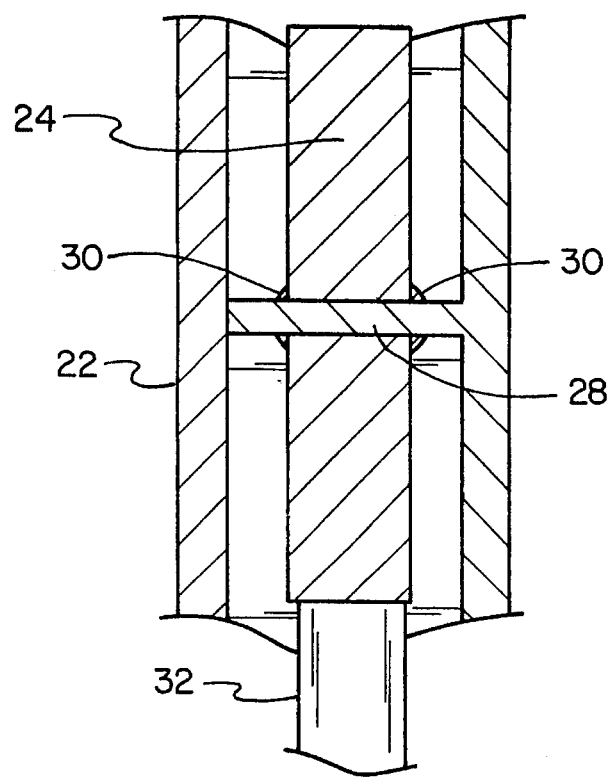
FIG. 7 is a cross sectional view taken along line 7—7 of FIG. 5.

As shown in FIGS. 5 through 7, the engaging means 12 of the present invention 10 preferably comprises a gear box 22 coupled to a lower end of the handle opposite the T-handle 20 of the handle means 16. A first gear 24 is rotatably mounted within the gear box 22, with a second gear 26 being similarly rotatably mounted within the gear box and spaced from the first gear 24. As shown in FIG. 7 for the first gear 24, each of the gears 24 and 26 is mounted about a gear axle 28 extending across an interior of the gear box 22. The gears 24, 26 are axially secured relative to the axles 28 by a pair of spaced abutment plates 30 which are secured to the gear axle and cooperate to capture the respective gear 24 or 26 therebetween.

With continuing reference to FIG. 5, it can be shown that the engaging means 12 further comprises a first gripping rod 32 which is integrally or otherwise fixedly secured to the first gear 24, and a second gripping rod 34 which is integrally or otherwise fixedly secured to the second gear 26. The gripping rods 32, 34 project exteriorly of the gear box 22 through an elongated aperture 36 descending along a bottom portion of the gear box. Each of the gripping rods 32 and 34 terminates at a lower distal end thereof whereat a first gripping foot 38 and a second gripping foot 40 are respectively mounted so as to project orthogonally from the respective gripping rod. By this structure, the gripping rods 32 and 34 can be pivoted to bring the respective gripping feet 38 and 40 into an abutting relationship so as to capture the weed 14 therebetween, as illustrated in FIG. 1. The weed 14 can then be subsequently pulled from the ground surface through a manual manipulation of the handle means 16. Because the gripping feet are advantageously straight in configuration, a simple rocking motion of the handle means 16 causes first ends of the gripping feet to engage the ground surface, with second ends thereof pivoting away from the ground surface to effect removal of the weed 14.

To effect pivoting of the gripping rods 32 and 34 together so as to capture the weed 4 between the gripping feet 38 and 40 as described above, a rack member 42 is movably mounted within the gear box 22 and engaged to both the first and second gears 24 and 26. As shown in FIG. 5, the rack member 42 includes oppositely directed and unlabeled rack teeth which engage the gears 24 and 26. A tension rod 44 is coupled to the rack member 42 and extends through the handle tube 18 of the handle means 16 to couple with an actuator bar 46. The actuator bar 46 is movably mounted relative to the handle tube 8 and can be biased towards the T-handle 20 of the handle means 16 to effect movement of the rack member 42 against the force of a coil spring 48 interposed between the rack member and an interior surface of the gear box 22. The actuator bar 46 is preferably positioned through a pair of elongated apertures formed in the handle tube 18 to movably mount the actuator bar relative to the handle means 16. By this structure, a gripping of the actuator bar 46 and the T-handle 20 simultaneously to bias the actuator bar 46 into contact with or towards the T-handle 20 will pull the tension rod 44 to bias the rack member 42 against a force of the coil spring 48 resulting in a rotation of the first and second gears 24 and 26 to pivot the gripping rods 32 and 34 towards one another. The weed 14 positioned between the gripping feet 38 and 40 will thusly be captured between the gripping feet, whereby the handle means 16 can be manually manipulated to pull the weed from the associated ground surface.

Figure 8:
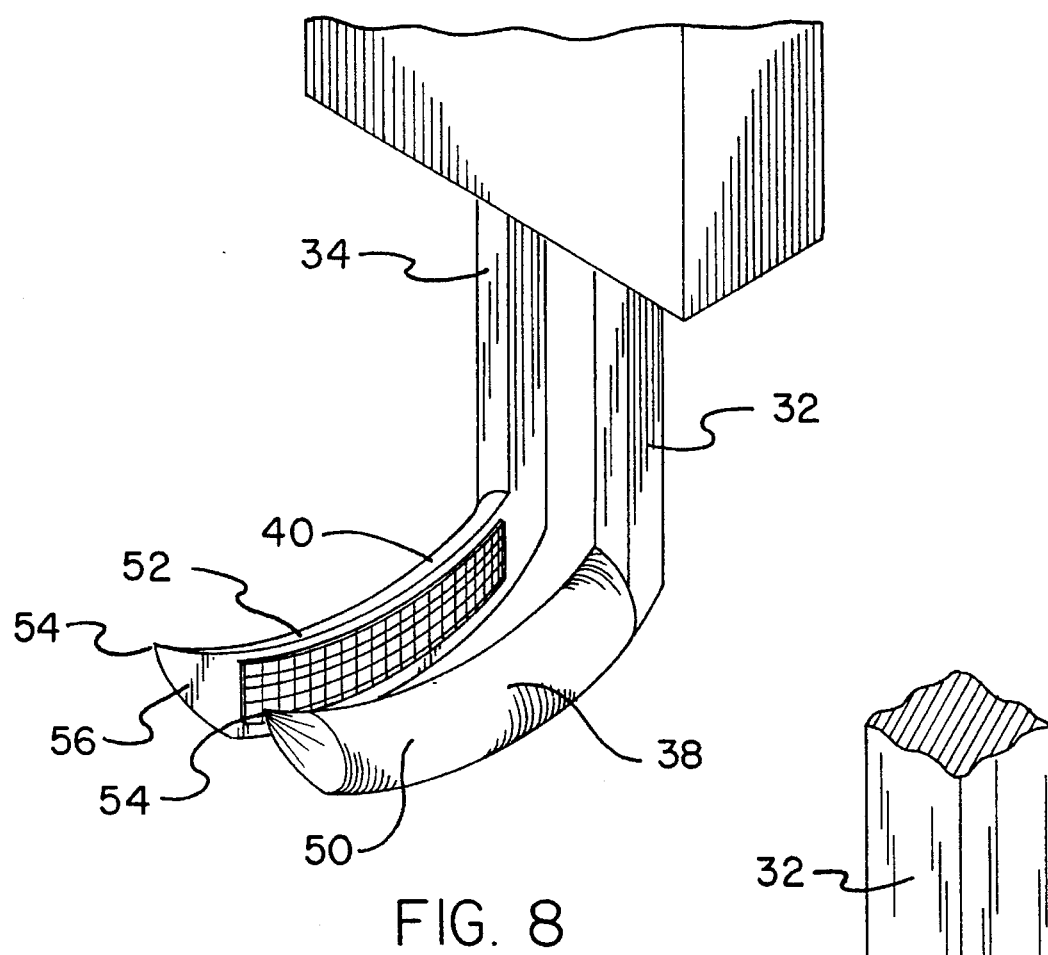
FIG. 8 is an isometric illustration of a first gripping foot and a second foot comprising a portion of the present invention.
Figure 9:
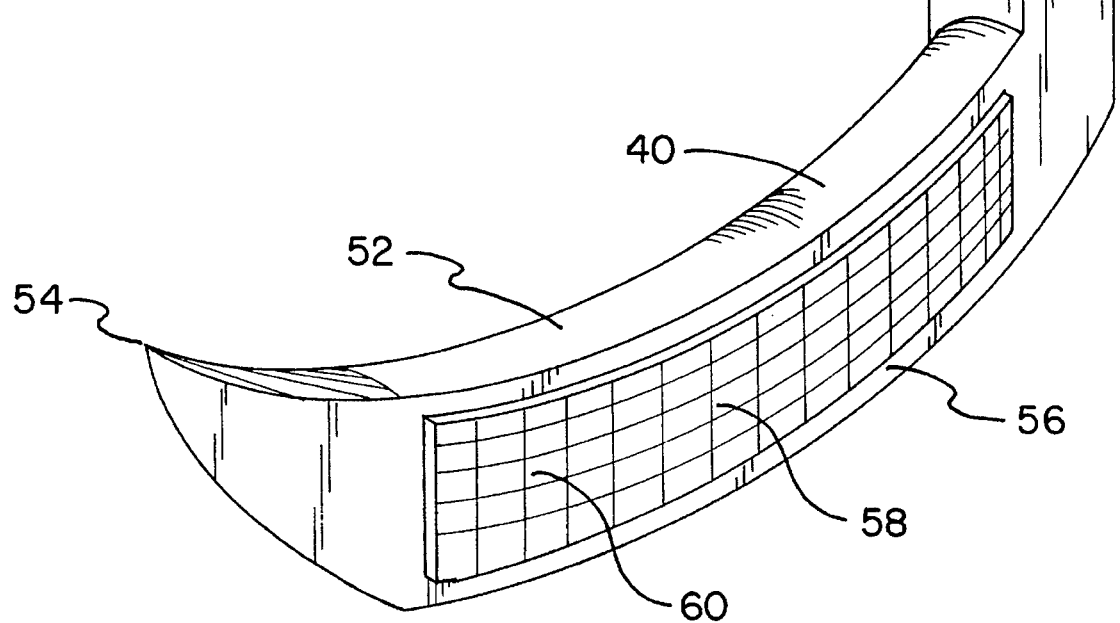
FIG. 9 is an enlarged isometric illustration of the second gripping foot.

Although the gripping feet 38 and 40 have thus far been illustrated as comprising substantially straight rod members, the gripping feet can also be shaped into the configuration illustrated in FIGS. 8 and 9 of the drawings. To this end and as shown in FIG. 8, the gripping feet 38 and 40 preferably comprise first and second arcuate members 50, 52 which extend from the respective first and second gripping rods 32 and 34. Each of the arcuate members 50, 52 is shaped so as to define a sharpened piercing tip 54 which can be utilized to pierce the ground surface extending around the weed 14 prior to capturing and removal of the weed, thereby grasping the weed at a point closer to the root structure thereof. The arcuate members 50 and 52 are preferably semi-circular in cross section and include facing flat engaging surfaces 56 which cooperate to frictionally engage and capture the weed 14 during removal thereof. As shown in FIG. 9 for the second gripping foot 40, a resilient gripping pad 58 of substantially arcuate configuration relative to the second arcuate member 52 can extend along the flat engaging surface 56 thereof to promote frictional engagement of the gripping foot relative to the weed 14. Preferably, the resilient gripping pad 58 is shaped so as to define an exterior textured surface 60 further enhancing such frictional engagement.

In use, the weed pulling device 10 according to present invention can be easily utilized by an individual wearing gloves or the like to effect engagement and removal of undesirable vegetation, such as weeds or the like from a standing or remote position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A weed pulling device comprising:

an engaging means for engaging a weed to be pulled from a ground surface; and, a handle means coupled to the engaging means for facilitating manual manipulation and operation of the engaging means;

wherein the handle means comprises a substantially hollow handle tube extending from the engaging means; and a T-handle coupled to a distal end of the hollow handle tube and oriented orthogonally relative thereto;

wherein the engaging mean comprises a ear box coupled to a lower end of the handle tube opposite the T-handle of the handle means; a first gear rotatably mounted within the gear box, a second gear rotatably mounted within the ear box and spaced from the first gear; a first gripping rod fixedly secured to the first gear; a second gripping rod fixedly secured to the second gear, the gripping rods projecting exteriorly of the gear box and terminating at a lower distal end; a first gripping foot mounted to the lower distal end of the first gripping rod; and a second gripping foot mounted to the lower distal end of the second gripping rod; a rack member movably mounted within the gear box and engaged to both the first and second gears; a tension rod coupled to the rack member and extending through the handle tube of the handle means; an actuator bar movably mounted relative to the handle tube proximal to the T-handle, the actuator bar being coupled to the tension rod; and a spring interposed between the rack member and an interior surface of the gear box;

wherein the actuator bar is positioned through a pair of elongated apertures formed in the handle tube to movably mount the actuator bar relative to the handle means such that a gripping of the actuator bar and the T-handle simultaneously to bias the actuator bar into contact with the T-handle will pull the tension rod;

wherein the gripping feet comprise first and second arcuate members which extend from the respective first and second gripping rods, each of the arcuate members being shaped so as to define a sharpened piercing tip which can be utilized to pierce the ground surface, the arcuate members being semi-circular in cross section and include facing flat engaging surfaces which cooperate to frictionally engage and capture the weed.

2. The weed pulling device of claim 1, and further comprising a plurality of resilient gripping pads of substantially arcuate configuration, each of said gripping pads extending along the flat engaging surface of an individual one of the gripping feet.

3. The weed pulling device of claim 2, wherein the resilient gripping pad is shaped so as to define an exterior textured surface.

4. A weed pulling device comprising:

an engaging means for engaging a weed to be pulled from a ground surface;

a handle means coupled to the engaging means for facilitating manual manipulation and operation of the engaging means;

wherein the handle means comprises a substantially hollow handle tube extending from the engaging means; and a T-handle coupled to a distal end of the hollow handle tube and oriented orthogonally relative thereto;

wherein the engaging means comprises a gear box coupled to a lower end of the handle tube opposite the T-handle of the handle means; a first gear rotatably mounted within the gear box, a second gear rotatably mounted within the gear box and spaced from the first gear; a first gripping rod fixedly secured to the first gear; a second gripping rod fixedly secured to the second gear, the gripping rods projecting exteriorly of the gear box and terminating at a lower distal end; a first gripping foot mounted to the lower distal end of the first gripping rod; and a second gripping foot mounted to the lower distal end of the second gripping rod; a rack member movably mounted within the gear box and engaged to both the first and second gears; a tension rod coupled to the rack member and extending through the handle tube of the handle means; an actuator bar movably mounted relative to the handle tube proximal to the T-handle, the actuator bar being coupled to the tension rod; and a spring interposed between the rack member and an interior surface of the gear box;

wherein the gripping feet comprise first and second arcuate members which extend from the respective first and second gripping rods, each of the arcuate members being shaped so as to define a sharpened piercing tip which can be utilized to pierce the ground surface, the arcuate members being semi-circular in cross section and include facing flat engaging surfaces which cooperate to frictionally engage and capture the weed.

* * * * *